United States Patent
Lygas

(10) Patent No.: US 6,240,176 B1
(45) Date of Patent: May 29, 2001

(54) METHOD TO ALERT A PHONE OPERATOR BY MAGNETIC MEANS OF AN INCOMING CALL

(75) Inventor: Edward A. Lygas, San Marcos, CA (US)

(73) Assignees: Sony Electronics, Inc., Park Ridge, NJ (US); Sony Corporation, Tokyo (JP)

( * ) Notice: Subject to any disclaimer, the term of this patent is extended or adjusted under 35 U.S.C. 154(b) by 0 days.

(21) Appl. No.: 09/099,437

(22) Filed: Jun. 18, 1998

(51) Int. Cl.$^7$ ........................................ H04M 3/00
(52) U.S. Cl. .............................. 379/373; 379/418
(58) Field of Search .................... 379/387, 373, 379/34, 421, 374, 375, 376, 371, 433, 418; 455/567

(56) References Cited

U.S. PATENT DOCUMENTS

| | | | |
|---|---|---|---|
| 5,181,023 | * | 1/1993 | Fujii .................................. 340/825.46 |
| 5,510,660 | * | 4/1996 | Flatau et al. ............................ 310/26 |
| 5,640,441 | * | 6/1997 | Serrano et al. ........................... 379/34 |
| 5,651,052 | * | 7/1997 | Serrano ................................. 455/567 |
| 5,729,589 | * | 3/1998 | Samson ................................. 379/34 |
| 5,764,751 | * | 6/1998 | Konishi ................................ 379/373 |
| 5,867,796 | * | 2/1999 | Inutsuka ............................... 455/567 |
| 5,884,831 | * | 3/1999 | Sato et al. ............................. 228/6.2 |
| 5,909,068 | * | 6/1999 | Wakiwaka et al. ....................... 310/15 |
| 5,936,516 | * | 8/1999 | Narea et al. ......................... 340/407.1 |
| 5,956,626 | * | 9/1999 | Kaschke et al. ....................... 455/115 |
| 5,963,877 | * | 10/1999 | Kobayashi ............................ 455/567 |
| 6,002,763 | * | 12/1999 | Lester et al. .......................... 379/421 |

* cited by examiner

*Primary Examiner*—Richemond Dorvil
(74) *Attorney, Agent, or Firm*—Ronald P. Kananen; Rader, Fishman & Grauer

(57) ABSTRACT

A vibrating device for alerting a phone user of an incoming call includes a receiver of an electric signal representing the incoming call, and a converter which renders the electric signal into a mechanical movement that is felt by the skin of the user as a sensational touching. The converter contains a magnetostrictive generator controlled by an electric signal representing incoming signals. A telephone set incorporates the vibrating device into its ringer.

6 Claims, 2 Drawing Sheets

METHOD TO ALERT A PHONE OPERATOR BY MAGNETIC MEANS OF AN INCOMING CALL

BACKGROUND OF THE INVENTION

1. Field of the Invention

The present invention relates to a field of telecommunications. More specifically, it relates to portable phones. Still more specifically, the present invention relates to novel method and apparatus for alerting a user of such a phone of an incoming call.

2. Description of the Related Art

For a number of years, portable phones have been well known. They are fed by a battery (-s) which makes them capable of being operative with no wire connection to a base unit. There are several kinds of such portable phones, cordless phones, radio phones, cellular phones, and pagers being exemplary of this category.

The portable phones are equipped with electronic ringers notifying users of incoming calls. However, situations can be easily imagined where an audible ringer would be noisy and thus inappropriate. During meetings, operations, at night, etc., any unexpected sound can be worrisome for those not involved.

SUMMARY OF THE INVENTION

Therefore, the object of the invention is to provide a method of and an apparatus for alerting a phone user of an incoming call, the method and apparatus keeping all the advantages of prior art whereas being free of its disadvantages.

A further object of the invention is to provide a method of and an apparatus for alerting a phone user of an incoming call, the alert being non-audible.

Still further object of the present invention is to provide a method of and apparatus for alerting a phone user by magnetic means for an incoming call, the magnetic means being magnetostrictive means.

According to the invention, a method of alerting a phone user of incoming calls is provided, the method comprising the steps of receiving an electric signal representing the incoming call and converting the electric signal into mechanical movement that can be felt by the skin of the user.

The electro-mechanical converting is proposed to perform by magnetostrictive means.

An apparatus for alerting a phone user of incoming calls is provided according to the present invention, the apparatus comprising means for receiving an electric signal representing the incoming call and means for converting said electric signal into mechanical movement that is sensationally touching for the user.

The converting means are magnetostrictive means.

The magnetostrictive means includes a magnetostrictive generator.

The magnetostrictive generator comprises a transformer, having a core made of a material exhibiting high magnetostrictive properties and primary and secondary windings wound around the core, and a switch controlled by the electric signal representing the incoming call. The primary and secondary windings are connected in series and paralleled by a capacitor, the parallel connection being connected in series with the switch. The primary winding is fed from an electric energy source.

The core is fixed at its one side while the other side is left free for movement.

The core is specifically made of annealed vanadium permendur.

Also, according to the present invention, a phone set is provided comprising an antenna connected to a receiver, a microcontroller ($\mu$controller) connected to the receiver and to a user interface, as well as a ringing device and a speaker circuitry connected to the $\mu$controller. The ringing device includes a magnetostrictive generator, to thus ensure that incoming calls be received in a physically sensible rather than in an acoustic mode.

BRIEF DESCRIPTION OF DRAWINGS

These and other objects, features and intended advantages of the invention will be more readily apparent by reference to the ensuing detailed description in conjunction with the accompanying drawings wherein.

DETAILED DESCRIPTION OF THE PREFERRED EMBODIMENTS

Figure 1:
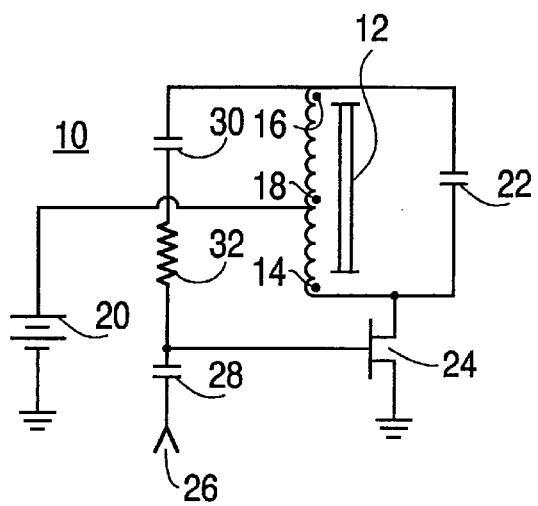
FIG. 1 shows a schematic diagram of a magnetostrictive generator used for converting electric signals according to the present invention.

Referring to FIG. 1, a magnetostrictive generator 10 constructed in accordance with a broad aspect of the invention includes an autotransformer 12 having a primary winding 14 connected in series with a secondary winding 16, the both windings being wound around a common core (not shown) formed of a material exhibiting high magnetostrictive properties. A tap 18 between the windings 14 and 16 is connected to a battery 20. A capacitor 22 is connected in parallel with the primary and secondary windings 14, 16 of the transformer 12. A transistor 24 is connected in series with the primary winding 12 and controlled from an input 26 through an isolating capacitor 28. A storage capacitor 30 and a limiting resistor 32 connected in series are placed in parallel to the transformer 12 and a controlling junction of the transistor 24.

In operation, briefly, when an electric signal appears at the input 26, the transistor 24 opens and a current begins to flow through the primary winding 14 of the transformer 12. Since the winding 12 and 14 are wound on the common core, the voltage developed across the primary winding 14 produces in turn a voltage across the secondary winding 16, and the combination of the voltages across the windings 14, 16 is applied to charge the commutating capacitor 22. During the most of the time the commutating capacitor 22 is being charged, the core of transformer 12 is in an nonsaturated state so it has a relatively high inductance and, therefore, the current flowing in the loop comprising the primary and secondary windings 14, 16 of the transformer 12 and the communicating capacitor 22 is relatively low.

As the charge upon the commutating capacitor 22 increases to a sizable value, the core of the transformer 12 saturates, and the inductance decreases to a lower value at which it can no longer support the high voltage across the capacitor 22. Discharge of the energy stored in the commutating capacitor 22 through windings 14, 16 causes the current flowing through both the windings 14, 16 to substantially increase that drives the core further into saturation.

The secondary winding 16 is formed of a much larger number of turns than the primary winding 14 and is connected so that the flux is additive when the commutating capacitor 22 is discharging. Thus, the large current flow back through the winding 16 further increases the magnetic field intensity in the core. At this point, the transistor 24 turns off due to a negative charge applied by the discharge through the RC chain 30–32. The circuit is allowed to ring down until the circuit energy is dissipated, and the very large magnetic field intensity causes deformation of the highly magnetostrictive core of the transformer 12.

Figure 2:
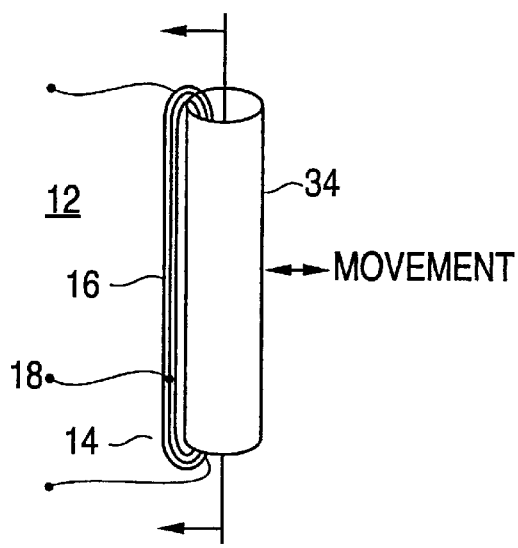
FIG. 2 illustrates a magnetostrictive transducer employed in the generator of FIG. 1.
Figure 3:
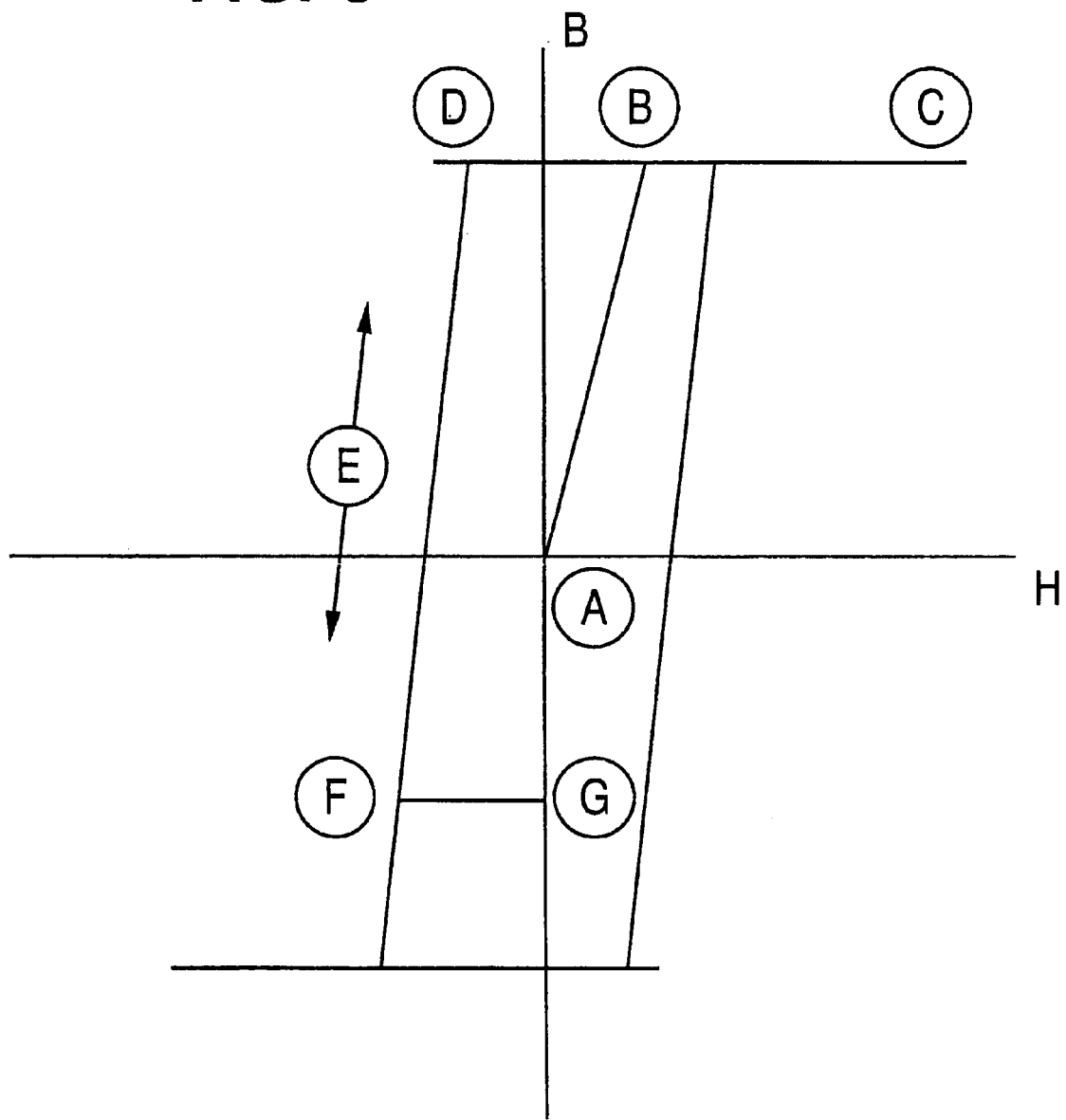
FIG. 3 is a representation of a hysteresis loop generated in the operation of the transducer of FIG. 2.

The operation of the circuit of FIG. 2 can be further appreciated from inspection of the BH curve shown in FIG. 3. Initially, the circuit begins operation around the origin of the BH on the B axis curve at point "A". When the switch 26 is closed and the capacitor 27 begins to discharge through the primary winding 21 of the transformer 20, the magnetic field intensity linearly increases until the transformer core reaches saturation at point "B". Once the core of the transformer 20 reaches saturation, and the commutating capacitor 22 begins discharging because the core inductance of the transformer will no longer support the high voltage across the capacitor, the current sharply increases to thereby drive the core of the transformer 20 into hard saturation as illustrated at point "C" of the BH curve. Before reaching the point "C", the switch 26 is opened. It is at the point "C" of the saturation of the core that its magnetostriction or deformation is greatest. The acoustic pulse is generated by the compression of the fluid created by the deformation of the core. As the circuit energy dissipates its inductance switches to the high state at point D. By now the current flow has started in the opposite direction. The core's BH valves follow the core material BH curve to point "E" somewhere on the curve. Because of the current reversal, the commutating capacitor has charged partially at point "F" at which the current has peaked. The circuit again establishes its neutral or at rest position, the "B" field is reduced so that the circuit comes to rest on the BH curve at point "G" which will lie somewhere on the B axis. Thereafter the processes are again repeated. The point on the vertical axis of the BH curve at which the transformer comes to rest is a function of the supply voltage, the time it takes to reach saturation from the rest position on the BH curve and the reset time. It should be noted that the BH curve which is generated is of a square loop configuration, that is, the BH curve has an essentially parallelogram configuration with flat upper and lower extremes and steeply rising sides. This is referred to herein as a "square loop" property.

Referring now to FIG. 2, the autotransformer 12 is shown with the primary winding 14 and the secondary winding 16 wound around a core 34. It has been found in the construction of the transformer 12 that the fabrication of the transformer about a rolled cylindrical core of annealed vanadium permendur is particularly well suited to provide the high magnetostriction (and deformation) required. It is to be understood that other magnetic materials known in the art by their magnetostrictive properties can also be used for the core.

The windings 14, 16 and the left side of the core 34 are rigidly fixed. The right side of the core 34 is free to move when the magnetic field intensity causes deformation of the core. This flex can be felt by the user's skin as a sense of touch when the apparatus is placed into the phone and carried by the user.

Figure 4:
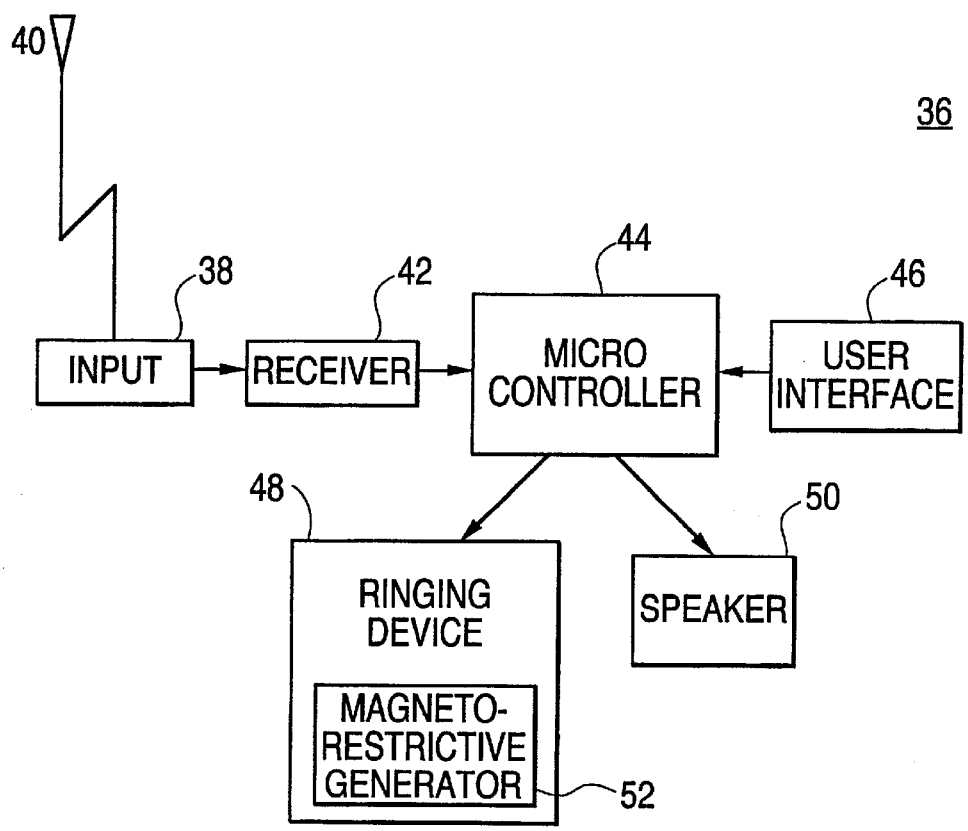
FIG. 4 depicts a structural diagram of a phone set using the generator of FIG. 1.

Referring now to FIG. 4 where a typical digital cellular phone set 36 is shown incorporating the present invention, the phone set 36 comprises an input 38 with an antenna 40 connected to a receiver 42, a μcontroller 44 connected to the output of the receiver 42, a user interface circuitry 46 tied with the μcontroller 44, a ringing device 48 and an earpiece amplifier and speaker portion 50. In accordance with the principles of the present invention, the ringing device 48 incorporates a magnetostrictive generator 52 of the type described in the above.

In operation, an incoming signal is captured by the antenna 40 and sent to the receiver 42 where it is converted into a binary code. The binary code is read by the μcontroller 44 and processed as directed by its own internal software and by signals provided through the user interface 46. In accordance with the operator's instructions that are input from the circuitry 46 into the μcontroller 44, the latter sends an activation command to either the earpiece amplifier and speaker portion 50 or to the device 48 comprising the magnetostrictive generator 52. The activation command is terminated when instructed through the user interface by the operator. When the activation command is received by the magnetostrictive generator 52, the generator is activated in the manner described in the above to create a large magnetic field intensity. This results in the deformation of the core 34 that can be felt by the skin of the user carrying the phone set 36 while being unheard by anybody.

The foregoing description of the invention has been directed primarily to a particular preferred embodiment in accordance with the requirements of the patent statutes and for purposes of explanation and illustration. It will be apparent, however, to those skilled in the art that modifications and changes in the specifically described and illustrated method and apparatus may be made without departing from the scope and spirit of the invention which is thus not restricted to the particular form illustrated and described, but covers all the modifications which may fall within the scope of the following claims.

What is claimed is:

1. A method to alert a phone user by magnetic means of an incoming call, the method comprising:
   receiving an electric signal representing the incoming call; and
   converting said electric signal into mechanical movement to thus make the incoming signal sensationally touching for the user, wherein
   said converting is performed by a magnetostrictive generator comprising a transformer with a core made of material that exhibits high magnetostrictive properties, a primary winding and a secondary winding, said primary and secondary windings being wound around said core, and a switch controlled by said electric signal, said primary winding being fed by an electric energy source, primary and secondary windings being paralleled by a capacitor, and said parallel connection being connected in series with said switch.

2. An apparatus according to claim 1, further comprising:
   a transistor, connected to said parallel connection and ground,
   wherein said capacitor is a commutating capacitor; and
   wherein said secondary winding has more turns than said primary winding;
   so that when said electric signal is applied through said switch, a voltage is developed across said primary winding thereby inducing a voltage across said secondary winding such that a charge across said commutating capacitor increases, thereby driving said core into saturation, resulting in a large current flowing through said secondary winding which eventually shuts off said transistor and causes stored energy to be dissipated across said transistor, thereby resulting in a vibration perceptible by a user.

3. An apparatus for alerting a phone user of an incoming call, said apparatus comprising:

means for receiving an electric signal representing said incoming call; and means for converting said electric signal into mechanical movement touchingly sensational by the user;

wherein said converting means is a generator comprising a transformer with a core made of material that exhibits high magnetostrictive properties, a primary winding and a secondary winding, said primary and secondary windings being wound around said core, and a switch controlled by said electric signal, said primary winding being fed by an electric energy source, primary and secondary windings being paralleled by a capacitor, and said parallel connection being connected in series with said switch.

4. The apparatus according to claim 3, wherein said core is fixed at its one side whereas another side of said core is left free for movement.

5. The apparatus according to claim 3, wherein said core is made of annealed vanadium permendur.

6. A phone set comprising an antenna input, a receiver, a microcontroller, a user interface, ringing means, and a speaker circuitry, said antenna input receiving incoming signals and being connected to said receiver, said receiver converting said incoming signals into a binary code and feeding said microcontroller with said binary code, said user interface controlling said microcontroller, said microcontroller controlling said ringing means and said speaker circuitry, said ringing means including a magnetostrictive generator, whereby said incoming signals is received by a user in a physically sensible mode.

\* \* \* \* \*